Aug. 15, 1972    J. H. LEMELSON    3,684,614
PROCESS FOR THE MANUFACTURE OF OPTICAL DISPLAY DEVICES
Filed Aug. 11, 1969

INVENTOR.
JEROME H. LEMELSON

United States Patent Office 3,684,614
Patented Aug. 15, 1972

3,684,614
PROCESS FOR THE MANUFACTURE OF
OPTICAL DISPLAY DEVICES
Jerome H. Lemelson, 85 Rector St.,
Metuchen, N.J. 08840
Continuation-in-part of application Ser. No. 393,292,
Aug. 31, 1964, now Patent No. 3,594,254, which
is a continuation-in-part of application Ser. No.
703,523, Dec. 18, 1957, now Patent No. 3,146,492.
This application Aug. 11, 1969, Ser. No. 849,117
Int. Cl. B32b 31/00
U.S. Cl. 156—292
8 Claims

ABSTRACT OF THE DISCLOSURE

A display material and an apparatus for automatically manufacturing same are provided. The display is composed of a plurality of gratings or grids which are separated from each other by a thin transparent sheet material, such as a plastic polymer, so as to provide an optical effect which includes light interference effects such as Moire fringe bands which are attention-getting.

In one form, the display is composed of a single sheet of plastic and is produced by continuously feeding said sheet past respective devices for disposing printed bands on both sides of the sheet. The display material may be used per se or laminated to a substrate such as a sheet of metal which is thereafter formed into a container.

In another form, a first array of interference bands is printed on a substrate such as a sheet of paperboard or metal after which a coating of thin polymeric, transparent material is disposed above the printed brands followed by printing a second array of bands on the outer surface of the transparent coating, the second bands being disposed at an angle to the direction of the first bands to provide an interference or fringe pattern.

In another form, a plurality of sheets of transparent plastic material or a flat tubular formation thereof, have opposed portions printed with bands of material which extend at angles to each other after which the two sheets are welded together along spaced apart lines to form pocket formations which are either separated from each other or deformable with respect to each other to provide optical interference efects which may change to an observer, depending on the condition of the material and/or the attitude of the eye of the observer with respect to the material.

RELATED APPLICATIONS

This is a continuation-in-part of application Ser. No. 393,292, filed Aug. 31, 1964, now Pat. No. 3,594,254, which is a continuation-in-part of application Ser. No. 703,523, filed Dec. 18, 1957, now Pat. No. 3,146,492.

SUMMARY OF THE INVENTION

This invention relates to display materials and automatic apparatus for manufacturing same. In particular, the display materials of this invention are composed of printed matter in the form of lines or bands which are space separated from each other by one or more sheets of plastic and are so angulated with respect to each other to generate interference effects such as interference bands or Moire fringe patterns. The resulting patterns are pleasing to the eye and attention getting and may be utilized per se or in combination with other printed matter to improve the appearance of an article of manufacture produced entirely of plastic, as a lamination of plastic and paperboard or as a lamination of plastic and sheet metal.

It is a primary object of this invention to provide a new and improved structure in a display material and an automatic apparatus for producing same.

Another object is to provide an apparatus for producing laminated materials which contain printed matter provided in such a manner on a substrate as to generate an interference effect which, to the human eye, appears to be quite different from the effect or appearance of the original printed matter.

Another object is to provide a new and improved structure in the display sheet material which appears to change or move when the angle of incidence of the eye of the observer varies with respect to the surface of the sheet material.

Another object is to provide a display sheet material containing changing optical effects created primarily by printing and without the necessity of embossing the sheet.

The above as well as further objects, features and advantages of the present invention will be best appreciated by reference to the following detailed descriptions of the invention, when taken in conjunction with the accompanying drawings, wherein.

Figure 1:
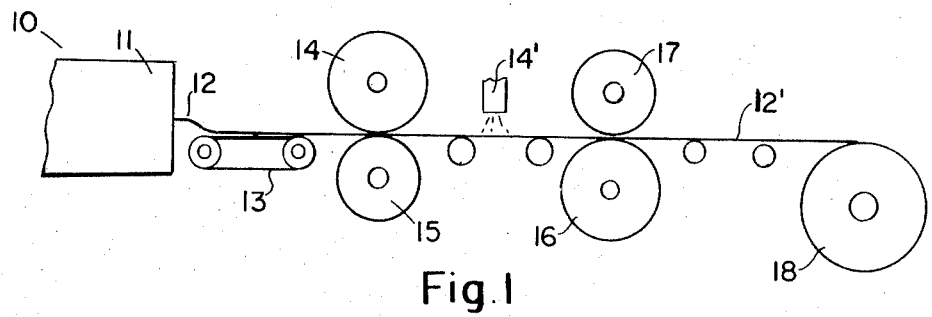
FIG. 1 is a schematic diagram of an apparatus for producing a plastic film which may form part of or comprise the entire structure of the instant invention.

There is shown in FIG. 1 an apparatus 10 for automatically and continuously producing a plastic sheet of film material 12 containing matter printed on both surfaces thereof and of such a nature that interference effects are produced to an observer viewing either side of the sheet. The apparatus 10 includes an extruder 11 continuously forming a sheet or film 12 which is fed to takeoff conveyor 13 to the bit of a first rotary printing press composed of a printing roll 14 and a depressor roll 15. The printing press may comprise any suitable conventional form of roller printing press or other printing means capable of disposing on the upper surface of sheet 12 a pattern which is composed at least in part of a plurality of lines extending parallel to each other as straight and/or curved lines which are closely spaced together in the form of a grating or grid. Disposed downstream of the press is a first blower 14' for causing the ink applied by roller 14 to the upper surface of sheet 12 to dry prior to passing said sheet to a second printing press composed of a roller 16 similar to 14 disposed against the opposite surface of 12 and cooperating with a depressor roll 17 to provide printed matter which includes a plurality of parallel lines, preferably of similar thickness and spacing to the lines provided by roller 14 on the opposite surface and disposed at an angle or angles with respect to the lines on the opposite surface which vary from about 3° to 25° so as to generate interference patterns or Moire fringe patterns which are viewable to an observer on either side of the printed sheet 12'. From the rollers 16 and 17, the sheet 12' may be wound on to a coil 18, laminated to a second sheet of material such as paperboard or a sheet of metal, or formed into articles of manufacture by deforming, welding and cutting said sheet to shape. Further plastic material in the form of coatings and/or other sheets or films may be laminated to either or both surfaces of the sheet 12' downstream of the rolls 16 and 17.

Figure 2:
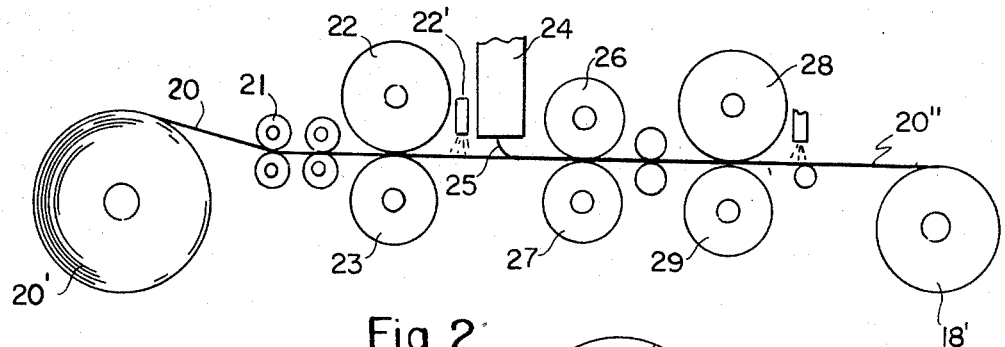
FIG. 2 is a schematic diagram of an apparatus for continuously forming a laminate having features of the instant invention.

In FIG. 2 is shown a modified form of the apparatus of FIG. 1 which is operative to produce laminated display sheet materials. A first sheet 20 of material such as metal, paperboard or plastic is fed from a coil formation 20' thereof to the bite of a plurality of powered rolls 21 which feed said sheet to a rotary printing press composed of a power rotated printing roll 22 and a depressor roll 23. The printing roll 22 contains means for disposing printed matter including a plurality closely spaced bands or lines of the type described, against the upper surface of sheet 20. A blower 22' situated downstream of 22 is operative to dry the printed material immediately after it is applied to the upper surface of sheet 20.

Disposed downstream of the printing press is a means for coating a transparent plastic material over the printed matter disposed on the upper surface of sheet 20. The means shown in FIG. 2 is a film extruder 24 for extruding a thin sheet or film 25 of transparent plastic material directly against the upper surface of sheet 20. The transparent material 25 may also be provided by calendering or roller coating same against said upper surface. Notations 26 and 27 refer to powered rollers for receiving the coated sheet downstream of the extruder 24 which serve to laminate or compress the film or sheet 25 against the upper surface of sheet 20 so as to bond same thereto. Downstream of the rollers 26 and 27 is a second printing press composed of a printing roll 28 disposed above the laminated sheet and cooperating with a depressor roll 29 to apply printed matter, at least a portion of which printed matter is composed of closely spaced lines or bands similar to those applied by the roll 22 but applied to the upper surface of the transparent plastic layer 25 at an angle to the bands applied beneath said layer. Said angle preferably is in the range of 3° to 25° so as to provide Moire interference fringes or bands and to an observer viewing the upper surface of the laminate. Downstream of the rolls 28 and 29 the composite sheet may be fed onto a coil formation thereof, cut to predetermined lengths, laminated to other materials or formed into articles such as containers, canisters, etc.

Suitable control means, not shown in FIGS. 1 and 2, are preferably provided to insure the constant and continuous feed of sheet 20, operation of printing rolls 22 and 28 and feed of plastic material 25 as well as any operations which are performed on the laminate downstream of the rolls 28 and 29.

The grid lines printed by means of the apparatus of FIGS. 1 and 2 as well as that provided hereafter, may vary in thickness from about $\frac{1}{32}$" to several thousandths of an inch or less in thickness. So called Ronchi gratings may be utilized for both surface printed lines of modifications thereof. The parallel lines may extend straight and/or curved and/or angular to each other on each surface of the sheet or sheets utilized.

In a modified form of the invention, parallel and nonparallel lines may extend on both surfaces of sheet walls employed to produce optical effects which vary or changes across the sheet material not only as a result of fringe patterns so formed but also as a result of the printed matter obscuring or exposing printed matter on the opposite surface or sheet depending on the viewing angle.

Figure 3:
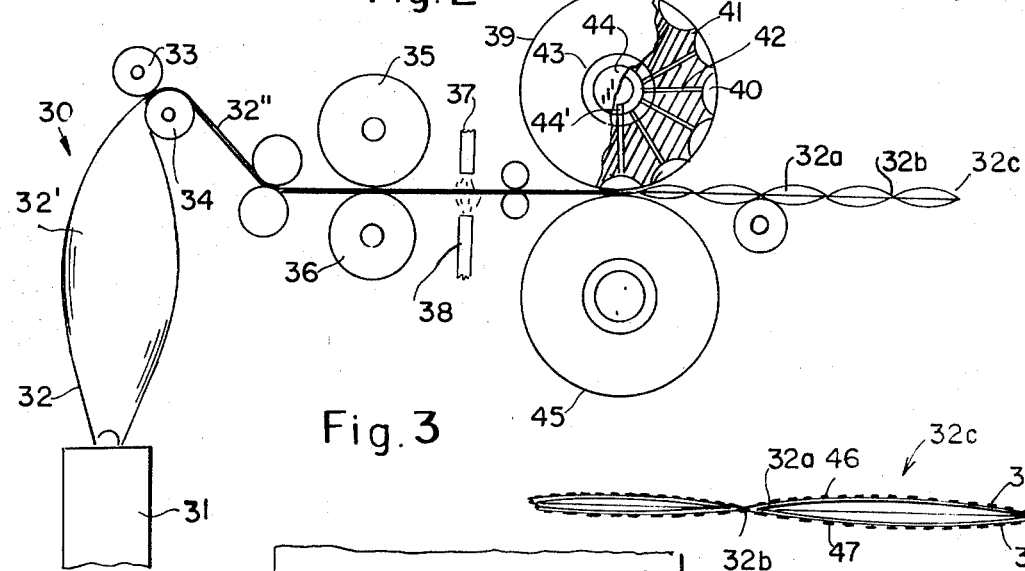
FIG. 3 is a schematic diagram of an apparatus for continuously forming a modified form of the instant invention.

In FIG. 3 is shown a modified form of the apparatus described for producing a sheet material containing a plurality of layers disposed one above the other either as a flat formation or a pocketed formation with each layer separated from the other by a gas volume, said structure being operative to provide variable optical effects which will be described.

The apparatus 30 of FIG. 3 comprises, in one form, an extruder 31 operative to extrude a tubular sleeve 32' of sheet material 32 which is expanded or blown as it is drawn upwardly from the extruder 31. The machine 31 is made in accordance with conventional blown film extrusion apparatus and one or more pairs of rollers, denoted 33, 34 in FIG. 3 are utilized to receive and compress the film 32 after it has completely cooled or set so that a flat closed sleeve-like formation 32" may be fed to the bite of printing and forming means without total lamination of the two walls of the sheet 32 together. The flat tube 32" is first fed to the bite of two rollers 35 and 36 which are printing rollers operative to respectively provide printed matter on opposite faces of the formation 32". The printed matter provided by each roller 35 and 36 is comprised of parallel grid or grating lines of the type described. In certain instances, other formations of printed material may be provided along with the lines printed on each face of the tubular formation. As in the examples hereinbefore described, at least a portion of each of the line formations provided on one surface of the tubular formation 32" are disposed parallel to each other and at an angle of between 3° and 25° to parallel similar lines disposed on the opposite face of the formation 32', thus providing a fringe pattern effect of the type described. Located downstream of the rolls 35, 36 are respective blowers 37 and 38 which operate to rapidly set or dry the ink applied by said rolls. Disposed beyond the blowers 37 and 38 are respective rolls 39 and 45 which cooperate with each other in heat sealing portions of the tubular formation 32" together in a manner to divide said tubular formation into a plurality of pockets denoted 32a in the drawing. Notation 32b refers to weld lines disposed across the tubular formation to form said pockets which lines may extend parallel to each other or in any other suitable direction such as to form quilt-like pockets of the tube as illustrated. In a preferred form of the apparatus of FIG. 3, the rolls 39 and 45 are shaped with a plurality of land-like raised portions 41 surrounding cavities 40 in the surface of the roll or drum, said land portions being operative to cooperate with similar land portions in the opposite drum to compress the flat tubular formation 32" together and weld same as the result of heating the drums and/or by radio frequency energy applied to the drum land-like formations which serve as electronic heat-sealing dies. The cavities 40 may each contain one or more passageways 42 extending through the wall of the drum to a central hub 43 which rotates on a hollow shaft 44 which is held stationary while the drum is driven. One end of the shaft 44 is closed and the other end is connected to a line (not shown) extending from a vacuum pump. One or more openings 44' in the wall of shaft 44 are directed towards the sheet formation 32" so that whenever a passageway 42 is aligned therewith, vacuum pressure is applied to the cavity of said passageway immediately above the tubular sheet formation 32" so as to draw the layer of said tubular formation adjacent said cavity 40 into said cavity. If the drum 39 is heated so as to soften the film or sheet, that portion drawn into the cavity 40 may be vacuum formed to shape and may remain deformed while the opposite wall portion of the sheet formation 32" is similarly formed in a cavity of the drum 45 so as to provide a sheet material as illustrated, which is composed of a plurality of pocket-like formations 32a having walls which are space-separated from each other as illustrated in FIG. 3. By so space-separating the walls of the tubular formation 32" by providing welded pockets therein, a variety of additional optical effects may be derived with respect to printed matter provided on opposite walls of the pocket formations as the result of the spacing of the walls and their movement with respect to each other during handling the pocketed sheet material 32c.

Drum 45 is similar in structure and operation to drum 39 and contains means for welding the opposite walls of the formation 32" together in cooperation with drum 39 as well as vacuum forming that wall portion of the flat tubular formation which is adjacent to said drum 45.

Beyond the rolls 39 and 45, the sheet material 32c may be coiled, cut to shape or otherwise fabricated. For example, one surface of the sheet may be laminated to a sheet of cardboard, plastic or metal to form a composite display material, covering or laminate capable of being fabricated per se into an article of manufacture.

It is also noted that a second sheet material such as a sheet of paperboard, plastic or metal may be laminated to one wall of the flat tubular formation 32" after printing has been provided thereon and prior to passage into abutment with a single forming and welding roll of the type illustrated and denoted 39 in the drawings.

The pocket formations 32a may be such as to maintain the opposite walls of the tubular formation substantially in abutment with each other but free to shift with respect to each other when the material is deflected or deformed or may be such as to maintain the opposite walls slightly apart at all times depending, of course, upon the spacing and configuration of the weld lines 32b provided by the power rotated rolls 39 and 45.

Materials of which the display sheet structures hereinabove described may be made may include such polymers as polyethylene, polyvinyl chloride, polystyrene, polyamide or other suitable flexible or rigid formations of commonly available resins which may be extrusion or roller coated in transparent or translucent grades of the polymer.

Thus it is seen the apparatus of FIG. 3 may be operated to provide a method for producing a multi-layer optically changeable sheet material by forming and feeding two layers of plastic sheet together, roll printing grid lines on respective opposite surfaces of the two layers which lines are angulated with respect to each other as described, and continuously sealing portions of the two layers along weld lines by means of welding apparatus such as the rolls 39 and 40.

It is also to be noted that the structure 32c shown in FIG. 3 may also be fabricated by feeding two sheets of transparent or translucent plastic material to the printing and welding forming means illustrated from respective extruders or roll supplies of each. A single sheet of preformed transparent plastic material may also be folded in half and fed continuously to the bite of the printing means and welding means illustrated.

In addition to printing straight parallel lines on both sides of the plastic coatings of films of FIGS. 1 to 3, the printing means thereof may be operative to print parallel curved lines and other Moire fringe generating indicia including closely spaced small spot-like areas on one surface or sheet which are shifted in location with respect to similar indicia on the other surface or sheet so as to produce various different Moire fringe patterns. Certain of the lines or indicia on one surface or sheet may also vary in the degree they are out of parallel or out of register with those on the other surface or sheet across the sheet material so as to provide optical effect and Moire fringe patterns which vary across the sheet. Fringe patterns and optical effects adjacent thereto may thus be generated which represent alpha-numeric characters, words, scenes, figures as well as abstract art.

It is also noted that the base sheet 20 of FIG. 2 may comprise a textile material such as woven or non-woven cloth which may be used for various articles of manufacture such as clothing, ribbon, etc.

Figure 4:
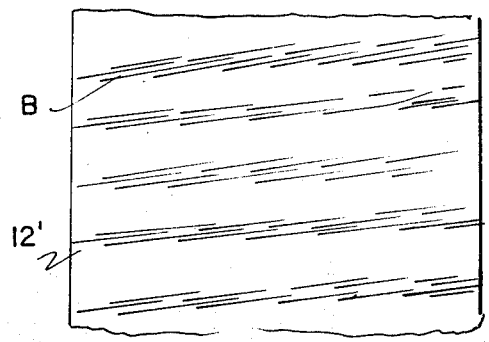
FIG. 4 is a plan view of a fragment of sheet material made in accordance with the apparatus of FIGS. 1 and 2 showing one type of interference effect.

FIG. 4 is a plan view of a fragment of the sheet material 12' of FIG. 1 showing the substantially parallel, although somewhat irregular, interference bands B formed in the fine grating or grid lines, not shown, printed on both surfaces of the sheet. The same type of effect or modifications thereof may also be provided when viewing the displaced surfaces of the composite sheet material 20" of FIG. 2 or the welded material 32c of FIG. 3.

Figure 5:
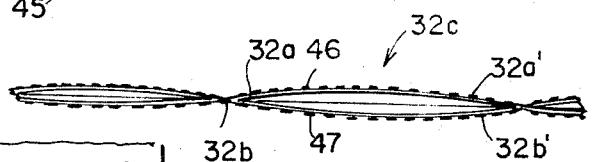
FIG. 5 is a longitudinal cross-section of a portion of one form of material produced by the apparatus of FIG. 3.

In FIG. 5 is shown further details of the quilted or cross-welded material 32c of FIG. 3 which is composed of opposite wall portions 32a' and 32b' forming the pocketed or welded sheet formation 32a having spaced apart weld lines 32b. The material between the weld lines 32b contain parallel grid lines 46 printed on one surface of one wall thereof and a second group of parallel grid lines 47 printed on the outer surface of the opposite wall of the formation and extending at an angle to the lines 46. The walls 32a' and 32b' may comprise separate sheets which have been welded together or opposite walls of a tubular formation such as 32" of FIG. 3 and may be formed so as to be retained closely together or separate from each other, as shown in FIG. 5, under slight internal pressure to variably separate the sheets and grid lines from each other so as to produce variable Moire fringe patterns for an observer on either side of the sheet formation.

I claim:

1. A method of producing an optical display sheet material comprising:
    providing separate first and second arrays of printed fringe pattern producing material on separate layers of sheet material wherein at least one of said layers is transparent plastic, disposing said separate layers one above the other with at least part of the printed matter on said transparent plastic located at an angle of between 3° and 25° with respect to the printed matter on the other layer so as to generate an optical interference effect noticeable from the surface of said transparent plastic layer, and
    sealing said separate layers together at spaced-separate portions of the layers so as to provide unbonded portions of the two layers of sheet material between said spaced-separated sealed portions.

2. A method in accordance with claim 1, including sealing said layers together and retaining portions of said layers of sheet material out of surface contact with each other along certain portions of their surfaces between the portions sealed together to permit relative movement between the bands of one layer and the bands of the other layer when the angle of incidence of an observer shifts with respect to said sheet material.

3. A method in accordance with claim 1 wherein said sealing is effected by welding space-separated portions of the layers of sheet material together.

4. A method of producing an optical display sheet composed of a plurality of layers of transparent plastic sheet material disposed one above the other comprising:
    providing first and second layers of transparent plastic sheet material with each sheet layer having at least one surface thereof containing means capable of forming bands of light from light directed thereagainst and
    disposing said first and second sheet material layers one above the other whereby at least a portion of the means forming said bands of light associated with one of said sheets is at an angle of between 3° and 25° with respect to a respective portion of said band-forming means of the other sheet in such a manner as to generate an interference effect to a person viewing the surface of at least one of said sheet materials, and
    welding said first and second sheet materials together along lateral-space-separated portions of the sheets while retaining the portions of the sheets therebetween unattached to each other.

5. A method in accordance with claim 4 including the step of providing and retaining a fluid under sufficient pressure between the space separated, sealed portions of the two sheets to retain the portions of the two sheets between the sealed portions substantially separated from each other.

6. A method in accordance with claim 1 including the step of providing and retaining a fluid under sufficient pressure between said separate layers of plastic so as to retain portions of said separate layers apart from each other to provide variable interference effects.

7. A method in accordance with claim 3 wherein the welding is affected along weld lines between minor portions of the areas of the abutted sheet materials leaving the major portions thereof unattached to each other.

8. A method in accordance with claim 1 wherein said separate layers of said sheet material are respective flexible plastic sheets which are formed into a composite pocketed sheet material during the sealing operation.

References Cited

UNITED STATES PATENTS

| | | | |
|---|---|---|---|
| 3,104,191 | 9/1963 | Hicks et al. | 156—182 X |
| 3,485,699 | 12/1969 | Bassett et al. | 156—290 |

CARL D. QUARFORTH, Primary Examiner

P. A. NELSON, Assistant Examiner

U.S. Cl. X.R.

156—156, 285, 210, 306, 277